July 2, 1929. W. V. BERGEN ET AL Re. 17,354

HIGHWAY SIGNAL

Original Filed June 27, 1921

Inventors
W. V. Bergen
A. C. Shute

By Atkins & Atkins

Attorneys

Reissued July 2, 1929. Re. 17,354

UNITED STATES PATENT OFFICE.

WILLIAM V. BERGEN, OF HILLSBORO, AND ARTHUR C. SHUTE, OF PORTLAND, OREGON, ASSIGNORS TO NITERDAY SIGNAL CO., A CORPORATION OF OREGON.

HIGHWAY SIGNAL.

Original No. 1,467,892, dated September 11, 1923, Serial No. 480,593, filed June 27, 1921. Application for reissue filed June 4, 1926. Serial No. 113,808.

Our invention relates to signals, and has reference more particularly to signals adapted to be permanently arranged along highways for indicating danger or need for caution in view of certain circumstances, and to give information and directions as to travel.

An object of the present invention is to provide a device of the character specified, adapted to be permanently arranged along highways for indicating danger or need for caution, wherein a visual signal is provided capable of being seen either in daylight or at night, and having means for illuminating the same through the reflection of projected rays of the headlight of an approaching car, to render the same visible at night.

Another object is to provide a device of the character specified adapted to be used as a railroad caution signal.

Another object of our invention is to provide a device of the character specified in which the signaling elements are effectually enclosed by a shell so as to prevent intrusion from without the shell into the interior thereof of any substance, and particularly of substantially all moisture whose presence therein would, in effect, render the device inoperative.

With these and other objects in view, our invention consists in certain novel features of construction, arrangement and combination of parts as will be hereinafter fully described and pointed out in the claims, reference being had to the accompanying drawings, in which:

In the present embodiment of the invention a casing is provided which includes a back plate A to which a shell B is to be secured.

The shell B is preferably of substantially truncated cone-shape and has spun upon the slanting wall portion a bead C which defines a slanting groove D in which the bevelled front edge T′ of a mirror E of a special type is seated, the mirror edge being sealed during the spinning of the shell. The concave face of the mirror follows a true circle, and the rear face of E which is shown convex preferably abuts closely against the back plate A when it has been put in place.

The front and, in the preferred form illustrated, the smaller end of the shell has spun upon it a bead 6 which defines a groove 7 to form a seat for the rear edge 8′ of an optical semaphore lens 8; the lens is sealed within the bead 6 at the time the shell is spun. By sealing the mirror and the lens at the time the shell is spun the necessity for rings or plates to hold the mirror or lens is done away with.

The rear end of the shell is made with an annular flange B′ which is provided with a series of openings *b* which register with similar openings *a* in the back plate A. This flange B′ is spun around the periphery of back plate.

The registering openings *a* and *b* are to receive screws or bolts F by which the signal casing as a whole is to be secured to a sign plate G which is a disc preferably made of porcelain on a high grade of iron.

By sealing the mirror and lens in the spinning at the time the shell is spun, the assembly is absolutely impervious to the weather, and the shell that holds the lens and mirror is practically air tight.

By being thus sealed the danger of fog, dust or rain on the mirror, or back of lens, is avoided.

The dead air space adds materially to the effectiveness of the signal by keeping the inside thereof thoroughly dry.

The signal case may be attached to any form of sign, but when put out as a complete signal it can either be placed below the sign, or at the center of the disc. If a special sign is already in use this signal can be attached to the post below the sign and will furnish the night signal as well as the day warning already in use. The disc G may be suitably secured to a post H.

Figure 3:
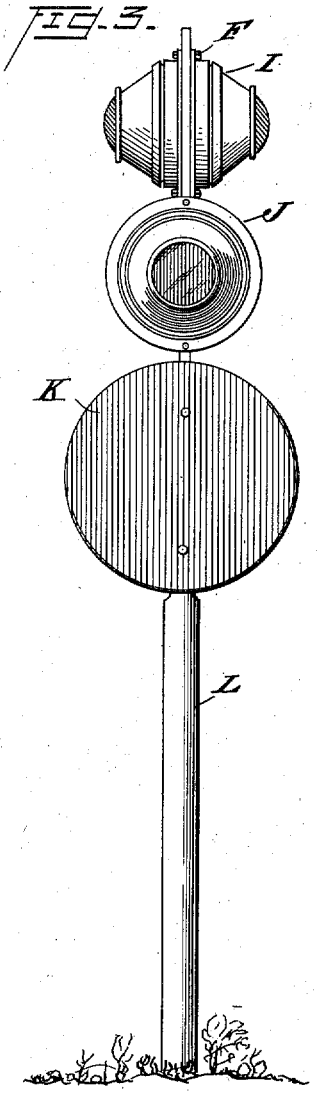
Figure 3 shows an adaptation of the invention to stand signals.
Figure 1:
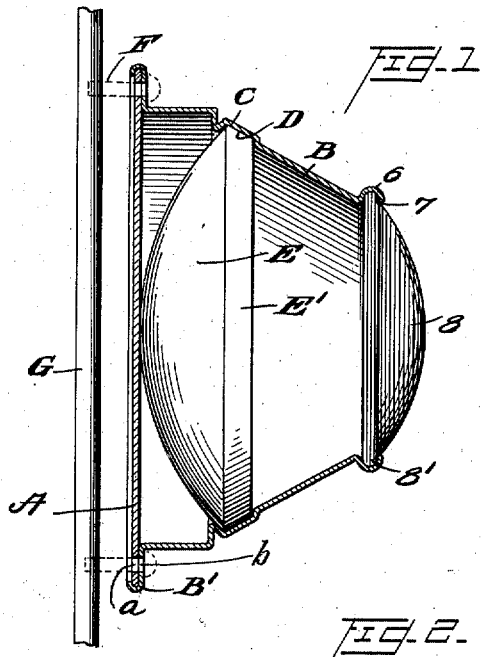
Figure 1 is a vertical section, partly in elevation, of the device.
Figure 2:
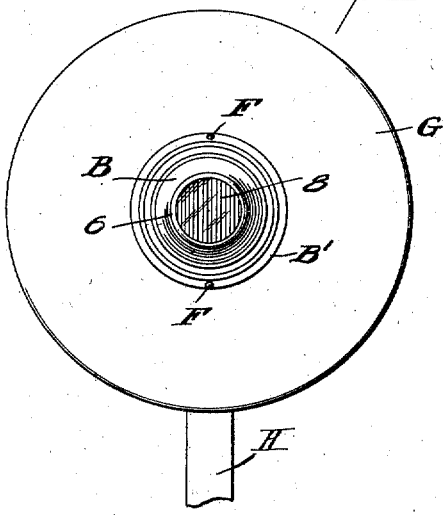
Figure 2 is a front elevation as in use.

In Figure 3 we have shown how the signals may be utilized in connection with a switch stand, the signals being designated by I and J, and the semaphore blade or disc being designated by K and the switch staff or mast by L.

The shell or casing is to be spun metal, preferably aluminum, and the sign or back disc, as before stated, is preferably made of porcelain on iron.

While this makes a very strong construction, if a lens becomes broken it is better to replace by a complete signal assembly, as it is much cheaper to manufacture even though it is necessary to replace the signal in this manner.

The rays of light projected from the headlight of an approaching automobile pass through the lens into the casing and are reflected forwardly onto the back of the lens and then pass through the same giving a very strong signal light.

The manner in which the aluminum case or shell is spun insures an exact focus of the lens on the mirror, and the spinning being done over a chuck insures all signals being uniform.

By this method of manufacture increased quality production is secured at decreased cost.

This signal as herein set forth requires little or no attention after being once installed, and becomes a permanent and substantial highway safeguard.

The device when once installed requires little or no attention, and is generally placed about three hundred feet in advance of the danger point, so as to give ample warning to the motorist.

The present invention is based upon the principles of light concentration and reflection.

We claim:

1. A signal of the character specified, comprising a forwardly converging imperforate truncated cone-shaped shell and a flat imperforate back covering therefor, said shell having a bead spun upon its slanting wall portion, said bead defining a slanting groove within the shell, a concave mirror having a beveled front end fitted in said groove, the back of the mirror abutting the flat back covering, a colored optical semaphore lens spun within the front end of the shell, said mirror located substantially at the exact focus of the lens, to receive light rays projected through the lens from an exterior light source and reflect them upon the back face of the lens and forwardly through the same.

2. A signal of the character specified comprising a rigid supporting base plate carrying indicia thereon, a forwardly converging imperforate truncated cone-shaped shell having an annular flange at its rear end, said flange provided with a series of openings to receive bolts, a flat back plate covering the rear end of said shell and having openings registering with the openings in said flange, said back plate secured to the shell by the flange spun over its periphery, bolts in said registering openings rigidly securing the shell and back plate to the supporting base, an optical semaphore lens spun within the front end of the shell, a concave mirror spun within the converging portion of the shell and positioned substantially at the exact focus of the lens, the back of the mirror abutting the flat back plate and braced thereby.

3. A signal of the character specified, comprising a rigid supporting plate, a forwardly converging imperforate truncated cone-shaped shell projecting from said plate, a colored lens held in the front end of the shell, and a concave reflector of greater diameter than said lens positioned within the converging portion of said shell to the rear of said lens and substantially at the exact focus thereof, said reflector being in abutting relation with said supporting plate.

4. A signal of the character specified comprising a truncated cone-shaped and forwardly converging spun shell, an optical semaphore lens spun within the front end of the shell, a mirror spun within the converging portion of the shell and substantially at the exact focus of the lens, a flat back plate abutting the back of the mirror at its central portion, an annular flange projecting from the rear edge of the shell and spun over the periphery of the said back plate, said flange also providing means whereby the complete assembly can be removably secured to a base or support.

5. A signal of the character described, comprising an air-tight shell, a bead forming a groove in the shell, intermediate its front and rear, a mirror in the shell carried at its periphery in said groove, a colored lens peripherally carried by a second groove in said shell at the front of the same and in advance of the mirror, the mirror being arranged substantially at the focus of the lens whereby it will receive light rays projected through the lens from a source of light exterior to the shell and reflect them back through the lens and forwardly therefrom into space, said shell making an air-tight engagement with the mirror and lens peripheries whereby the shell is substantially air-tight between the lens and mirror, and a back plate arranged behind said mirror, said shell being formed with a groove to receive the periphery of said back plate, the lens, mirror, and back plate being independently held in separate grooves in said shell.

6. A signal of the character described, comprising an air-tight shell, a bead forming a groove in the shell, intermediate its front and rear, a mirror in the shell carried at its periphery in said groove, a colored lens peripherally carried by a second groove in said shell at the front of the same and in advance of the mirror, the mirror being of greater diameter than the lens and being arranged substantially at the focus of the lens whereby it will receive light rays projected through the lens from a source of light exterior to the shell and reflect them back through the lens and forwardly therefrom into space, said shell making an air-tight engagement with the mirror and lens peripheries whereby the shell is substantially air-tight between the lens and mirror, and a back plate arranged behind said mirror, said shell having its edge inturned to form a groove receiving the periphery of said back plate, the lens, mirror, and back plate being independently held in separate grooves in said shell.

In testimony whereof we have hereunto set our hands.

WILLIAM V. BERGEN.
ARTHUR C. SHUTE.